July 8, 1958 D. W. DAVIES 2,842,684

ELECTRICAL PULSE GENERATING CIRCUITS

Filed Nov. 17, 1952

Donald Watts Davies
Inventor
By
Stevens, Davis, Miller & Mosher
his Attorneys

United States Patent Office 2,842,684

Patented July 8, 1958

2,842,684

ELECTRICAL PULSE GENERATING CIRCUITS

Donald Watts Davies, Southsea, England, assignor to National Research Development Corporation, London, England, a British corporation Application November 17, 1952, Serial No. 321,024

Claims priority, application Great Britain November 26, 1951

6 Claims. (Cl. 307—106)

The present invention relates to a circuit for generating one electrical pulse which shall occur with a specified timing relative to a given periodically repeating series of pulses. Such circuits are especially useful in electrical digital computing engines and are known as one-shot circuits.

The general arrangement of such circuits has been described in application Ser. No. 202,615, now Patent No. 2,686,632, issued August 17, 1954, with reference to Figure 10 of the drawings. The present invention will be described with reference to the accompanying drawings and in the terms used in the art of digital computing engines. These terms are defined and explained in Patent No. 2,686,632.

The present invention employs means capable of generating a derived periodic series of electrical pulses having the timing of selected pulses in a given set of periodic pulses, a delay-line mismatched at its far end and fed at its near end with the output from a trigger so that at an intermediate point of the delay-line a wide pulse is started a predetermined time after the trigger is set and is ended a further predetermined time later by the pulse step reflected at the far end of the delay-line, means for setting the trigger at a predetermined time relative to the given set of pulses, the constants of the delay-line being chosen so that the wide pulse embraces a required single pulse in the derived series and means operated by this wide pulse for selecting this single pulse. In a preferred embodiment of the invention the single pulse is selected by using the wide pulse to control the generating means so that it generates only this pulse. Alternatively the generating means may run continuously and the single pulse may be selected from the output of the generating means by a gate conditioned by the wide pulse.

The circuit may also comprise a switch arranged to switch in a bias equivalent to the wide pulse when on, so that a succession of pulses instead of a single pulse may be obtained when required.

Reference will be made to the accompanying drawings of which:

To fix ideas it will be assumed that the invention is applied to a computing engine in which the interdigit period is one microsecond and that each word comprises 32 digits so that 32 digits (32 microseconds) form a minor cycle and that the words are stored in a serial store (such as a mercury delay-line) which holds 32 words so that a major cycle is 32 words (1024 digit or microseconds). We will denote the digits in the minor cycles by P1, P2, P3 . . . P32.

Figure 1:
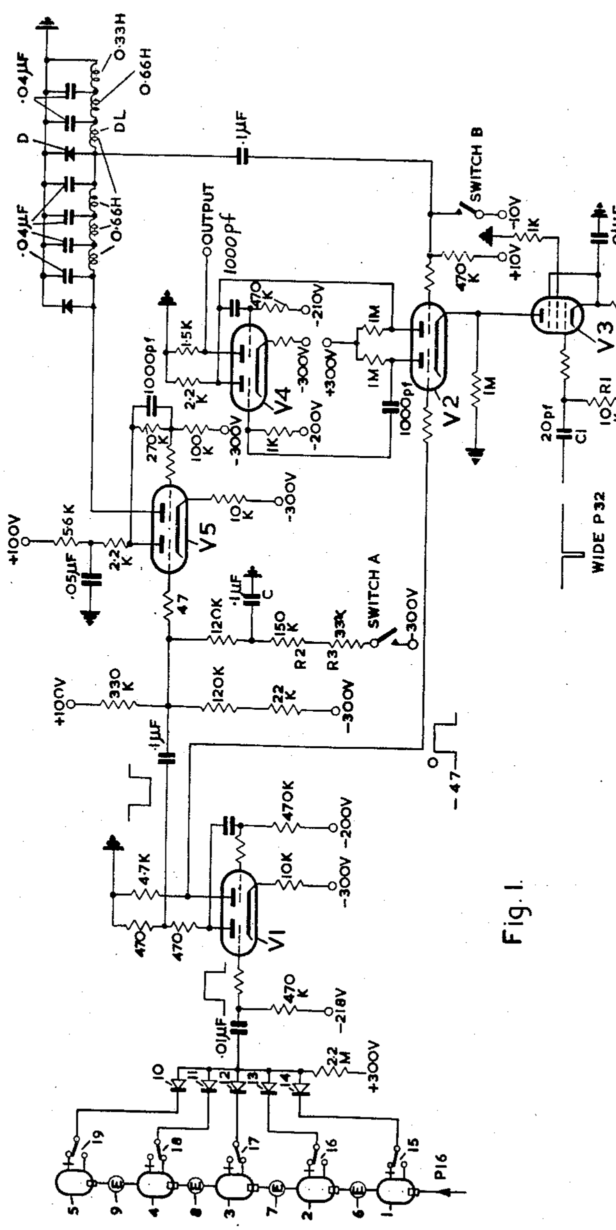
Fig. 1 shows one embodiment of the invention.

In Figure 1 there is shown a major-cycle counter comprising five triggers 1–5 connected in cascade by changeover connections with end elements 6–9 between the triggers. Counter circuits such as these are well known in the art of digital computers and their operation is described in Patent No. 2,686,632, issued August 17, 1954. The state of the trigger 1 is changed every minor cycle at P16 time by a pulse P16 applied at a changeover input. Either of the two outputs from each of the triggers 1–5 can be applied by switches 15–19 to the gate of threshold five comprising the diodes 10–14. The output from this gate will then be a positive pulse one minor cycle long starting at P16 time in a particular minor cycle which can be selected by adjustment of the settings of the switches 15–19. This minor cycle pulse is applied to a double-triode gate V1 and yields cleaned up pulses of opposite polarity on the two anodes of the gate V1. The positive-going pulse from the gate V1 is shown at (*a*) in Fig. 2 and is used to operate a further double-triode gate V2. This gate can be operated only at the beginning of a minor *c* cycle because it is fed by a valve V3 which is conditioned to pass current by the back edge of a wide negative P32 pulse applied through the differentiating circuit R1C1. The current pulses from the valve V3 are shown at (*b*) in Fig. 2. The outputs from the gate V2 put a trigger V4 on and off as follows:

If the right-hand grid of V2 is maintained at —10 volts (i. e. if the switch B is closed) then normally the current pulses from the valve V3 pass through the right-hand side of the gate V2 and put (or try to put) the trigger V4 off (i. e. make the left-hand side of V4 conduct). This is because the left-hand grid of V2 normally rests at about —47 volts.

When, however, the left-hand grid of V2 has been raised to about earth potential by a positive pulse from V1 at P16 time, then at the following P32½ time the trigger V4 is put on and is then put off at the next following P32½ time because in the meanwhile the positive pulse from V1 has gone down to normal, i. e. —47 volts.

Figure 2:
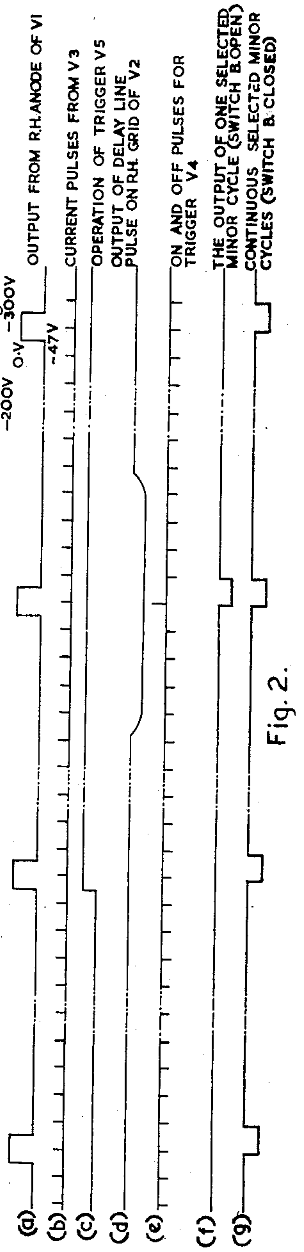
Fig. 2 shows the waveforms of potential occurring in the circuit shown in Fig. 1.

The output from V4 is then (as shown at (*g*) in Fig. 2) a series of negative going minor cycle pulses exactly covering a particular minor cycle which can be picked out by suitable setting of the switches 15–19. (It is in fact the minor cycle next following the one in which the gate V1 is fed with a positive pulse at P16 time.)

When a single minor cycle pulse is wanted the switch B is open so that the right-hand grid of V2 is normally maintained at +10 volts. The gate V2 passes the current pulse from V3 to one or other (but not both) of the anodes of V2 depending upon which grid of V2 is more positive at the time. While the right-hand grid of V2 remains at +10 volts and the potential of the left-hand grid varies between zero (ground) and —47 volts, each current pulse from V3 passes to the right-hand anode of V2 and causes only a short negative pulse on the right-hand grid of V4 which does not change the state of the trigger V4. To produce the single minor cycle pulse from the trigger V4 a long negative pulse of the kind shown at (*d*) in Fig. 2 is applied to the right-hand grid of V2. During the incidence of this long pulse, the right-hand grid of V2 is at approximately —10 volts, consequently when the left-hand grid rises to zero (ground) potential, the next current pulse from V3 goes to the left-hand anode of V2 and not to the right-hand anode. This gives a negative pulse on the left-hand grid of V4 and causes the trigger V4 to go on. By the time the next current pulse from V3 arrives the left-hand grid of V2 will have dropped back to —47 volts and the current pulse from V3 will go to the right-hand anode of V2 and thus cause a negative pulse on the right-hand grid of V4 thereby putting the trigger V4 off. The "on" pulse is indicated at (*e*) in Fig. 2 by an upward going line and the "off" pulses, which are repeated every minor cycle, are shown as downward going lines. The output from the trigger V4 in this mode of operation is shown at (*f*) in Fig. 2.

The timing of the output pulse depends on the timing of the pulses from the valve V1 and the timing of the current pulses from the valve V3 which have already been explained. The timing also depends on the long pulse shown at (*d*) in Fig. 2 and the formation of this pulse which is about one major cycle long will now be explained.

The double-triode valve V5 is connected to operate as a trigger and is normally biassed so that its left-hand side conducts and the trigger may then be said to be off. When the switch A is closed the potential of the left-hand grid of V5 starts to fall at a comparatively slow rate. On this slow rate of fall there are superimposed the negative going pulses from the right-hand anode of the gate V1. The pulses about 5 volts amplitude and are of course, in time with the pulses shown at (*a*) in Fig. 2.

The rate of fall of the potential of the left-hand grid of V5 is determined by the time constant of the resistances R3 and R2 and the capacity C and it is such that the trigger V5 goes on at the beginning of one of the negative pulses from V1. Once the trigger V5 has gone on it remains on until some indeterminate time after the switch A is opened again. The state of the trigger V5 is indicated at (*c*) in Fig. 2.

When the trigger V5 goes on a current pulse of 10 milliamps is fed to the delay-line DL This delay-line is matched at the near end by a rectifier.

The pulse travels along the line DL and about half a major cycle (in this case about ½ millisecond) it appears as a negative pulse across the rectifier D arranged about half way down the line DL. This pulse travels on down the line, is reflected and reversed at the short circuited end of the line and about one major cycle later cancels the negative pulse across the rectifier D. The long pulse across the rectifier D is, of course, the long negative pulse which is applied to the right-hand grid of the valve V2 and is shown at (*d*) in Fig. 2.

It will be seen that the wide pulse (Fig. 2(*d*)) allows the required pulse (Fig. 2(*f*)) to be generated. Alternatively the wide pulse from the delay-line may be used to gate the output from the trigger V4 which may then generate continuous selected minor-cycle pulses. This arrangement is not, however, a preferred embodiment of the invention.

What I claim is:

1. A one-shot circuit comprising means capable of generating a derived periodic series of electrical pulses having the timing of selected pulses in a given set of periodic pulses, a trigger, a delay-line mismatched at its far end and fed at its near end with the output from said trigger so that at an intermediate point of said delay-line a wide pulse is started a predetermined time after said trigger is set and is ended a further predetermined time later by the pulse tstep reflected at the far end of said delay-line, means for setting the trigger at a predetermined time relative to the given set of pulses, the constants of said delay-line being chosen so that the wide pulse embraces only one required single pulse in the derived series and gating means operated by said wide pulse for selecting said single pulse as an output.

2. A one-shot circuit as claimed in claim 1 and in which the means capable of generating the derived series of pulses is controlled by said wide pulse so that it generates only when the wide pulse is on.

3. A one-shot circuit as claimed in claim 1 and in which the means capable of generating the derived series is arranged to operate continuously.

4. A one-shot circuit comprising a gate arranged to pass, when conditioned, short pulses, a first trigger connected to be set and re-set by said short pulses at the beginning and end of a set of pulse periods, bias means for normally inhibiting said gate, a second trigger, a delay-line mis-matched at its far end and arranged to be fed with the output from said second trigger, means for controlling said gate by an output at an intermediate point in said delay-line, the constants of said line being chosen so that said output conditions said gate at a predetermined time after the second trigger is set and to inhibit said gate a further predetermined time later and a switch arranged to set said second trigger at a predetermined time relative to a given set of electrical pulses so that said gate is conditioned to operate said first trigger only during one required pulse period each time said second trigger is set.

5. A one-shot circuit as claimed in claim 1 and comprising a source of bias voltage and a switch arranged to apply said bias voltage to said gating means to control said gating means when said switch is operated.

6. A one-shot circuit as claimed in claim 4 and comprising a source of bias voltage and a switch arranged to apply said bias voltage to said gating means to control said gating means when said switch is operated.

References Cited in the file of this patent

UNITED STATES PATENTS 2,403,561 Smith ---------------- July 9, 1946